United States Patent
Ebner et al.

(10) Patent No.: US 10,095,488 B2
(45) Date of Patent: Oct. 9, 2018

(54) EXPRESSIVE GENERIC MODEL TECHNOLOGY

(71) Applicant: Braintribe IT—Technologies GmbH, Vienna (AT)

(72) Inventors: Stefan Ebner, Vienna (AT); Peter Brandner, Purkersdorf (AT); Peter C. Steinlin, Dornach (CH); Dirk Scheffler, Walzbachtal (DE); Gunther G. Schenk, Vienna (AT)

(73) Assignee: BRAINTRIBE IT—TECHNOLOGIES GMBH, Vienna (AT)

( * ) Notice: Subject to any disclaimer, the term of this patent is extended or adjusted under 35 U.S.C. 154(b) by 187 days.

(21) Appl. No.: 14/802,933

(22) Filed: Jul. 17, 2015

(65) Prior Publication Data

US 2016/0019033 A1    Jan. 21, 2016

Related U.S. Application Data

(60) Provisional application No. 62/026,575, filed on Jul. 18, 2014.

(51) Int. Cl.
*G06F 8/35* (2018.01)
*G06F 8/38* (2018.01)
*G06F 17/30* (2006.01)

(52) U.S. Cl.
CPC .................. *G06F 8/35* (2013.01); *G06F 8/38* (2013.01); *G06F 17/30* (2013.01)

(58) Field of Classification Search
CPC ............... G06F 8/35; G06F 8/38; G06F 17/30
See application file for complete search history.

(56) References Cited

U.S. PATENT DOCUMENTS

| 6,539,398 B1* | 3/2003 | Hannan ................... G06F 17/30 |
| 2004/0153992 A1* | 8/2004 | Molina-Moreno ....... G06F 8/35 |
| | | 717/105 |

(Continued)

OTHER PUBLICATIONS

Wikipedia, Swing (Java), 2013, pp. 1-8, downloaded from the Wayback Machine Internet Archive at <url>:https://web.archive.org/web/20130131222444/https://en.wikipedia.org/wiki/Swing_(Java).*

(Continued)

*Primary Examiner* — Thuy Dao
*Assistant Examiner* — Stephen D Berman
(74) *Attorney, Agent, or Firm* — Perkins Coie LLP

(57) ABSTRACT

Various of the disclosed embodiments concern systems and methods for constructing enterprise applications. A universal Smart Enterprise Information platform can operate as a hub for data retrieved from different internal and external sources and provide an integrated and automated way for enterprise information to be managed. More specifically, the platform is able to retrieve data from one or more sources and construct models that represent, for example, common business scenarios. The platform employs assorted software development techniques to bring together the business, design, and runtime domains. Using a unique development paradigm ("CORTEX"), the models can be used to construct an application with minimal programming efforts. The platform allows a user to construct compelling applications using preexisting structures that can be automatically converted to models, unlike conventional software development techniques that require large sections of code to be rewritten each time a new model or program is created.

12 Claims, 12 Drawing Sheets

(56) References Cited

U.S. PATENT DOCUMENTS

| | | | |
|---|---|---|---|
| 2007/0094306 A1* | 4/2007 | Kyriazakos | G06Q 10/10 |
| 2007/0156767 A1 | 7/2007 | Hoang et al. | |
| 2007/0239775 A1* | 10/2007 | Shultz | G06F 8/38 |
| 2008/0127069 A1 | 5/2008 | Ryazanov | |
| 2009/0182780 A1 | 7/2009 | Wong et al. | |
| 2010/0011338 A1* | 1/2010 | Lewis | G06F 8/10 |
| | | | 717/105 |
| 2011/0154287 A1* | 6/2011 | Mukkamala | G06F 8/20 |
| | | | 717/105 |
| 2012/0131561 A1* | 5/2012 | Spiess | G06F 8/35 |
| | | | 717/140 |
| 2012/0166976 A1* | 6/2012 | Rauh | G06F 8/38 |
| | | | 715/762 |
| 2012/0179987 A1* | 7/2012 | Mohan | G06F 8/38 |
| | | | 715/762 |
| 2013/0159037 A1* | 6/2013 | Keil | G06Q 10/06 |
| | | | 705/7.12 |
| 2014/0237443 A1* | 8/2014 | Pana | G06F 8/38 |
| | | | 717/105 |
| 2015/0074069 A1* | 3/2015 | Baeuerle | G06F 8/35 |
| | | | 707/702 |
| 2015/0220325 A1* | 8/2015 | Poon | G06F 8/35 |
| | | | 717/103 |
| 2015/0293750 A1* | 10/2015 | Yershov | G06F 8/315 |
| | | | 717/106 |
| 2016/0259627 A1* | 9/2016 | Michelsen | G06F 8/35 |
| 2017/0060856 A1* | 3/2017 | Turtle | G06F 17/30 |

OTHER PUBLICATIONS

Wikipedia, "Represntational State Transfer," 2013, pp. 1-4, downloaded from the Wayback Machine Internet Archive at <url>:https://web.archive.org/web/20130302074442/https://en.wikipedia.org/wiki/Representational_state_transfer.*

Zicari, "In-memory database systems. Interview with Steve Graves, McObject," pp. 1-8, downloaded from the Wayback Machine Internet Archive at <url>: https://web.archive.org/web/20130511002115/http://www.odbms.org/blog/2012/03/in-memory-database-systems-interview-with-steve-graves-mcobject/.*

Boris Motik et al., "A Conceptual Modeling Approach for Semantics-Driven Enterprise Applications," 2002, Lecture Notes in Computer Science, vol. 2519, pp. 1082-1099, downloaded from the Internet at <url>:https://link.springer.com. (Year: 2002).*

Aniruddha Gokhale et al., "Applying model-integrated computing to component middleware enterprise applications," 2002, Communications of the ACM, vol. 45. Issue 10, pp. 65-70, downloaded from the Internet at <url>:https://dl.acm.org (Year: 2002).*

Andrew Dinn et al., "Rock & Roll: A Deductive Object-Oriented Database with Active and Spatial Extensions," 2002, Proceedings 13th International Conference on Data Engineering, pp. 582, downloaded from the Internet at <url>:https://ieeexplore.ieee.org. (Year: 2002).*

International Search Report and Written Opinion dated Dec. 3, 2015, for International Patent Application No. PCT/US2015/040998 filed Jul. 17, 2015, pp. 1-10.

* cited by examiner

EXPRESSIVE GENERIC MODEL TECHNOLOGY

CROSS REFERENCE TO RELATED APPLICATION

This application claims the benefit of U.S. Provisional Patent Application No. 62/026,575 filed Jul. 18, 2014, which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the United States Patent and Trademark Office patent files or records, but otherwise reserves all copyright rights whatsoever. The following notice applies to the software, interfaces, and data as described below and in the drawings that form a part of this document: Copyright 2014, Braintribe IT-Technology GmbH, All Rights Reserved.

FIELD OF THE INVENTION

Various embodiments relate generally to software and computing. More specifically, various embodiments relate to modeling technologies that can be used to construct enterprise applications.

BACKGROUND

With the arrival of the era of cloud computing and big data technologies, members of a network (e.g., the Internet, or within social network domains such as Facebook® or Twitter®) are exposed to a vast amount of information from numerous messages and other activities from different sources. But this information generates a massive information overload, particularly when combined with data existing within an enterprise software application.

Conventional data models, data mining, and computerized automation techniques have all attempted to solve this information explosion problem. However, conventional models (e.g., a consistent formal system) suffer from several shortcomings. For example, different developing tools usually produce different models of the same domain, which makes it difficult to combine these models. Most conventional models are also at least partially incomplete with respect to information needed for mapping and exchange. This creates obstacles for consolidation, exchange, and integration of data.

The information described above has traditionally been stored by enterprises in self-contained repositories. Although software has been developed to access and present the information in a human-readable or proprietary machine-readable form, the software packages are often built upon distinct technologies that are difficult to integrate. Therefore, enterprises often need to acquire, manage, and maintain software and technologies for each repository, platform, etc.

BRIEF DESCRIPTION OF THE DRAWINGS

These and other objects, features, and characteristics will become more apparent to those skilled in the art from a study of the following Detailed Description in conjunction with the appended claims and drawings, all of which form a part of this specification. While the accompanying drawings include illustrations of various embodiments, the drawings are not intended to limit the claimed subject matter. Like reference numerals refer to corresponding parts throughout the figures and specification.

Figure 1:
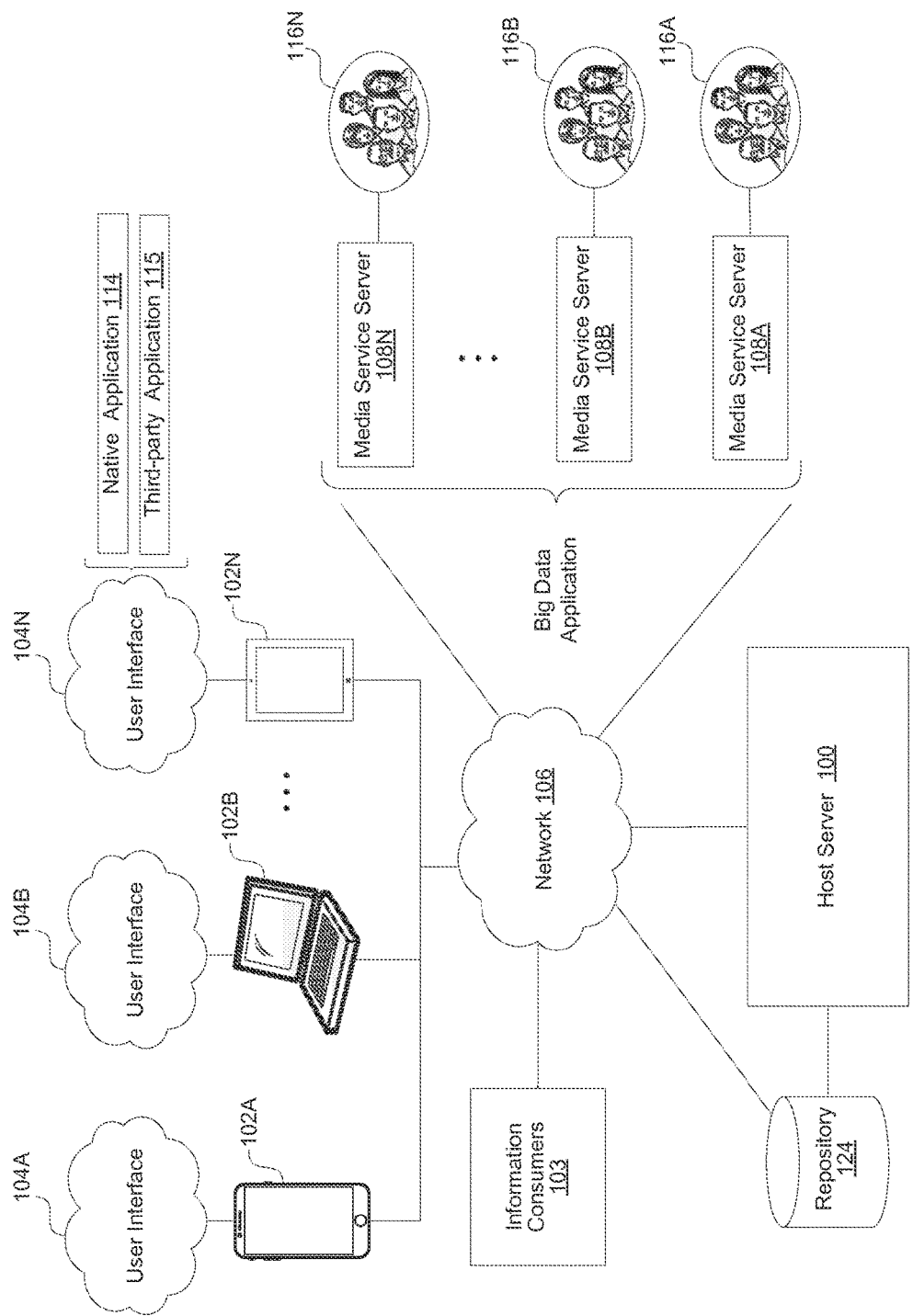
FIG. 1 is a generalized block diagram depicting a host server that functions as a universal "Smart Enterprise Information" (SEI) platform in accordance with various embodiments.

The figures depict various embodiments described throughout the Detailed Description for purposes of illustration only. While specific embodiments have been shown by way of example in the drawings and are described in detail below, the intention is not to limit the invention to the particular embodiments described. The invention is amenable to various modifications and alternative forms. Accordingly, the claimed subject matter is intended to cover all modifications, equivalents, and alternatives falling within the scope of the invention as defined by the appended claims.

DETAILED DESCRIPTION

Systems and methods are described herein for generating models that can be used to create enterprise applications. More specifically, various embodiments concern "Smart Enterprise Information" (SEI) platforms that employ assorted software development approaches (e.g., model-driven architecture (MDA), case tools) to bring together the business domain, design domain, and runtime domain of software development. As a unified development system, SEI platforms are able to capitalize on cross-domain synergies, unlike conventional development systems and techniques that have unique ways of describing, processing, etc.

In some embodiments, an SEI platform, which can also be referred to as "tribefire," provides Data as a Service (DaaS) or Data as a Platform (DaaP) functionality, which unlocks the value of enterprise information and allows the information to be readily combined with new technologies. The SEI platform can also support a unique development paradigm referred to as "CORTEX." CORTEX allows users (e.g., customers) of the SEI platform to develop compelling applications based on existing infrastructure, which provides the freedom to realize business value.

Terminology

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" throughout the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. For example, two devices may be coupled directly, or via one or more intermediary channels or devices. As another example, devices may be coupled in such a way that information can be passed there between, while not sharing any physical connection with one another. The words "associate with," meanwhile, means connecting or relating objects, items, etc. For example, a model may be associated with a particular business domain or entity. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware (or any combination thereof) components. Modules are functional components that can generate useful data or another output using specified input(s). A module may or may not be self-contained. An application program (also called an "application") may include one or more modules, or a module may include one or more application programs. "Metadata" provides information about other data and may be derived or obtained from the other data. Metadata is often composed of various individual pieces of metadata, also called "metadata elements."

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, and special significance is not to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Generic Expressive Model Technology

Generic data models are described herein that alleviate many of the aforementioned problems associated with conventional data models. Among others' effort in this area, Mathematician Kurt Friedrich Gödel normalized mathematical operations and their object (i.e., numbers) by clearly associating mathematical operations with numbers. Gödel created a presentation using this normalizing artifice that was powerful enough to prove the incompleteness of consistent formal systems. Embodiments of the present disclosure implement and enhance various techniques that exploit Gödel's model to build a universal SEI platform.

In order to develop and implement a new paradigm, Gödel's methodology has been applied in the field of theoretical computer science. Generic models are described herein that perform normalization of operators, operands, etc., in the field of software. Research has shown generic models to be effective in identifying reflective algorithms and providing in-depth analysis, which often leads to normalized modeling. After modeling, implementation (e.g., of an expert system) can be verified. The availability and flexibility of software development improves when the tools themselves become editable objects (e.g., models).

Generic modeling techniques can also be used to improve the development of the model algebra and to verify and provide potential operators. In some embodiments, reflexive operators of a higher order are created by concatenation of operators as a consequence of "Gödelization" (Gödel numbering). Similar to Gödel's methods in mathematics, the SEI platform is able to take advantage of increased processing power to deal with models in the area of computer science, especially in big data.

Furthermore, the algebra models, which are based on the generic model technology, may be immediately executable. Thus, once the object of observation (e.g., business domain to be modeled) is adequately described, an SEI platform can automatically employ the correct algebraic models without further intermediate steps (e.g., individual or custom programming). The time and effort normally required to develop a software program or application are reduced when using the generic expressive model technology, thereby increasing the rationalization effect.

System Topology Overview

FIG. 1 is a generalized block diagram depicting a host server 100 that functions as a universal SEI platform in accordance with various embodiments. As will be further described below with respect to FIG. 2, the platform generally employs a 5-layer architecture for creating models, which are then be used to construct enterprise applications. The models may also be referred to as "Smart Enterprise Information Models" (SEIMs). Among other functions, the SEI platform is able to aggregate structured and/or unstructured data retrieved from various local and remote (e.g., online) sources. The SEI platform is communicatively coupled to the sources via a network 106 or multiple networks. The remote data sources can include network-accessible databases (e.g., Internet of Things (IOT) or big-data systems) and/or cloud-based systems.

For example, the host server 100 may be coupled to one or more media service servers 108A-N that host media services. In some embodiments, the structured and/or unstructured data (e.g., original or reposted content) hosted by the media service servers 108A-N is contributed by a crowd or network of users. The media services, meanwhile, can include social media networks (e.g., Facebook®, Twitter®), cloud-based solutions (e.g., Dropbox®, Google® Drive), news feeds, blogs, and any other sites, services, or platforms where users are able to share information with others.

The SEI platform can be accessed through a variety of methods. For example, in some embodiments the platform actively or reactively provides processed data streams (e.g., intelligence) to users of client devices 102A-N. The client devices 102A-N include mobile phones, personal digital assistants (PDAs), tablet computers (e.g., iPad®), personal computers, or any other network-accessible computing device capable of establishing a connection with the host server 100 across a network 106. Non-portable devices, such as desktop computers, servers, or computer/server clusters, could also be used. The client devices 102A-N can be configured to present a user interface through a browser, web portal, software program, application, etc., that allows a user to interact with the SEI platform.

Each client device 102A-N typically includes a display or some other output functionality that allows information to be presented to the user, such as data exchanged between the devices 102A-N and the host server 100. For example, the client devices 102A-N can include user interfaces 104A-N that allow the users to view the data transmitted by the SEI platform. The data (e.g., intelligence) could be viewed in a native software application 114 (e.g., a mobile application, a web browser, or a conventional desktop software application) that runs on the client devices 102A-N. Additionally or alternatively, the intelligence could be transmitted to a third-party application 115 (e.g., through the use of an application programming interface (API)). In some embodiments, the data is provided to one or more information consumers 103 (e.g., enterprise tool, software program, or application) for any suitable application or purpose.

The client devices 102A-N, media service servers 108A-N and respective networks of users 116A-N, information consumers 103, repository 124, and the host server 100 can be coupled to one another across a network 106 or multiple networks. In some embodiments, the client devices 102A-N, information consumers 103, and host server 100 are directly connected (e.g., wired or wirelessly) to one another. The network 106 (e.g., Internet, local area network, wide area network, point-to-point dial-up connection) could be a collection of distinct networks operating wholly or partially in conjunction to provide connectivity to the client devices 102A-N, the host server 100, and other components of FIG. 1. In such embodiments, the network 106 may appear as a single network to the serviced systems and devices. Communications can also be protected in accordance with a secure communications protocol, such as secure sockets layer (SSL) or transport layer security (TLS).

The host server 110 may be internally or externally communicatively coupled to one or more repositories 124 that store raw and/or processed (e.g., aggregated) data. That is, the repository 124 can be locally (e.g., physically) connected to the host server 100 or remotely accessible (e.g., via the network 106). The repository 124 can store models, APIs, descriptive data, images, system information, drivers, and/or any other item utilized by the host server 100 and/or other components of the system. In some embodiments, the repository 124 is composed of several distinct repositories. The repository 124 may be managed by a database management system (DBMS), such as Oracle®, IBM DB2®, Microsoft Access®, Microsoft SQL Server®, PostgreSQL, MySQL®, FileMaker®, etc., or an existing integrated business application. The repositories can be implemented via object-oriented technology, text files, and/or via their native APIs. Additional metadata or configuration information can be managed by a distributed database management system, an object-oriented database management system (OODBMS) (e.g., ConceptBase, FastDB Main Memory Database Management System, JDO Instruments, ObjectDB), an object-relational database management system (ORDBMS) (e.g., Informix®, OpenLink Virtuoso, VMDS), a file system, and/or any other convenient or known database management solution.

The SEI platform operated by the host server 100 can be configured to combine and structure data within a network 106 or across multiple networks, use generic expressive model techniques to extract and/or identify relevant data, and allow a user (e.g., customer) of the platform to build custom applications that exploit the data and various layers of architecture provided by the platform.

Figure 2:
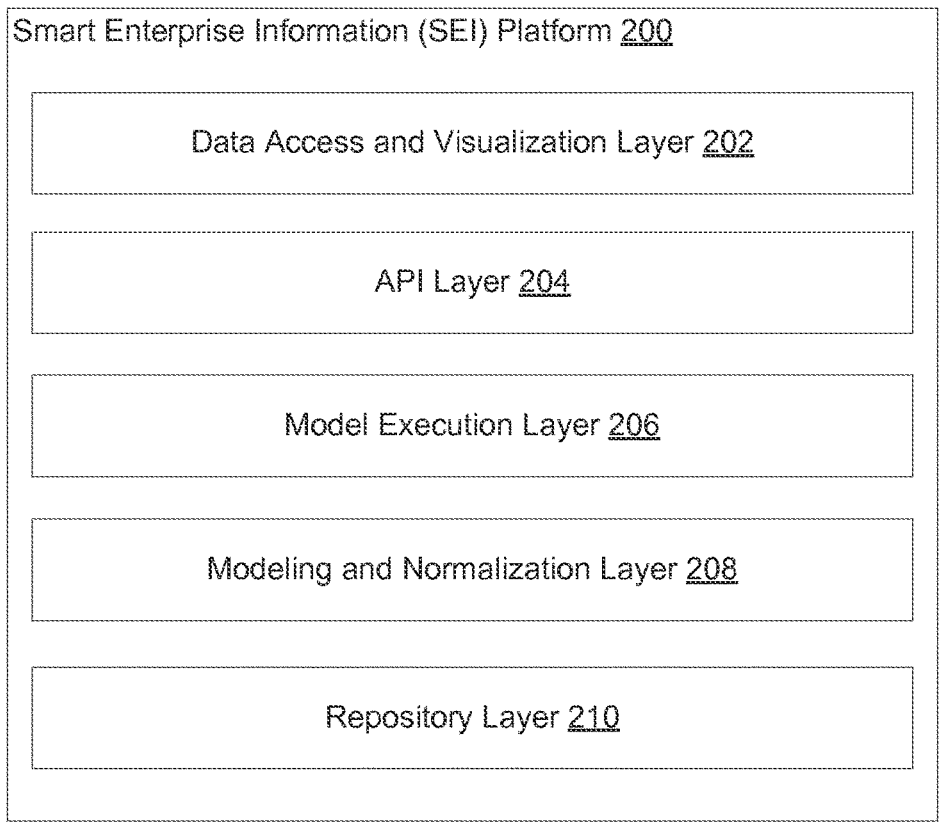
FIG. 2 is a generalized block diagram depicting the five-layer architecture of an SEI platform according to some embodiments.

FIG. 2 is a generalized block diagram depicting the five-layer architecture of an SEI platform 200 according to some embodiments. The simplified functional diagram is provided to highlight the key architectural concepts of the SEI platform 200, which is, in fact, a clearly structured and integrated architecture.

The SEI platform 200, along with its core technologies, allows users to develop compelling enterprise applications that are based on preexisting infrastructure, thereby providing the freedom to realize new business value. The five-layer architecture can be used to construct models that form the basis of enterprise applications. Each of the five layers is typically responsible for unique tasks, namely, data integration, virtualization, aggregation, automation, and exposure.

The data access and visualization layer 202 generally includes three distinct categories:
  Custom applications (e.g., third party application 115 of FIG. 1) including web applications, mobile applications, etc.
  Enterprise consumers (e.g., information consumers 103 of FIG. 1) including tools for business intelligence (BI), business process management (BPM), customer relationship management (CRM), enterprise application integration (EAI), enterprise resource planning (ERP), etc.
  Platform applications (e.g., native application 114 of FIG. 1) such as a Control Center, Generic Model Editor, Modeler, etc.

There are two general purposes for accessing the SEI platform 200: (1) adding, editing, removing, etc., model metadata (e.g., to query model definitions or discover properties, names, types, etc.) and (2) adding, editing, removing, etc., models (e.g., to work with instance data). The API layer 204 can be integrated in various ways to use the functionalities provided by the SEI platform.

For example, in some embodiments the JAVA-API layer 204 is implemented, thereby enabling convenient usage of the models defined within the SEI platform 200. In conjunction with the operational API, full-fledged access to various features (e.g., querying, serialization, reflection) can be granted.

Once the API has been handled and learned by the accessing application, future models can be handled the same way. The API layer 204 allows applications to be developed and implemented much quicker than a service-oriented architecture (SOA), which creates, implements, and codes a new service for every new business entity or functionality, In some embodiments, a static API is extended by expressive APIs (i.e., models) that are automatically created from the model definitions. Expressive APIs are not only able to make use of code completion in a Java development environment, but are also self-descriptive to a large extent. Consequently, expressive APIs are usually easy to use and quick to learn. While the SEI platform 200 is generally indifferent to the data source, the API layer 204 may support expressive coding for specific uses, features, etc.

Alternatively, the API layer 204 can be constructed using a Representational State Transfer (REST) architecture that grants CRUD access (i.e., permits creating, reading, updating, deleting, etc.). The REST style may be used to support environments beyond Java. XML, JSON, etc., serializations can fully transport model instance representations, including the metadata corresponding to the models.

But the models only come to life after being deployed to the model execution layer 206 and combined with an access, which is the actual implementation communicating with the underlying physical repository. The access is a service that supports at least two ways of interacting with the model data: querying and applying manipulations. In some embodiments, the exposed persistence service given by an access supports additional services (e.g., process engine, audit trail, event system, security) triggered by event sourcing when applying manipulations. After deployment (e.g., via the integrated deployment engine), the model could immediately be tested using a Graphical User Interface (GUI), also referred to as a "Control Center," that permits browsing, searching, and/or manipulation of model instances.

A modeling and normalization layer 208 allows models to be created, defined, etc. Model definition is normally divided into (1) the actual structure or "type skeleton" that includes the declaration of types and their properties; and (2) the annotation data. Metadata associated with the annotation data can be used to specify additional characteristics or properties of the types defined in the skeleton (e.g., translations of locale-specific texts), as well as integrate information used in validating processes and security services. In some embodiments, the metadata also includes mapping information for the smart models. The process of specifying metadata for one or more model types is referred to as "model enrichment."

The models themselves can be created using various tools, such as:

Java Classes: Create models directly in a Java development environment.
Unified Modeling Language (UML): Use an extensible markup language (XML) metadata interchange (XMI) capable tool to model various business entities.
XML Schema Document (XSD): Use to describe various models using XML standards, such as document type definition (DTD).
Microsoft® Excel®: The SEI platform can be configured to support Excel files to easily create usable models.
Third-Party Tools: Various metadata tools could be used (e.g., GEFEG.FX).
Custom Tools: Nearly any source of structured information (e.g., business information) can be transformed into a model by writing a custom coder-decoder ("codec").
Integrated Platform Modeler: An integrated sophisticated visual modeler can be used to create and edit models seamlessly within the Control Center.

Figure 3:
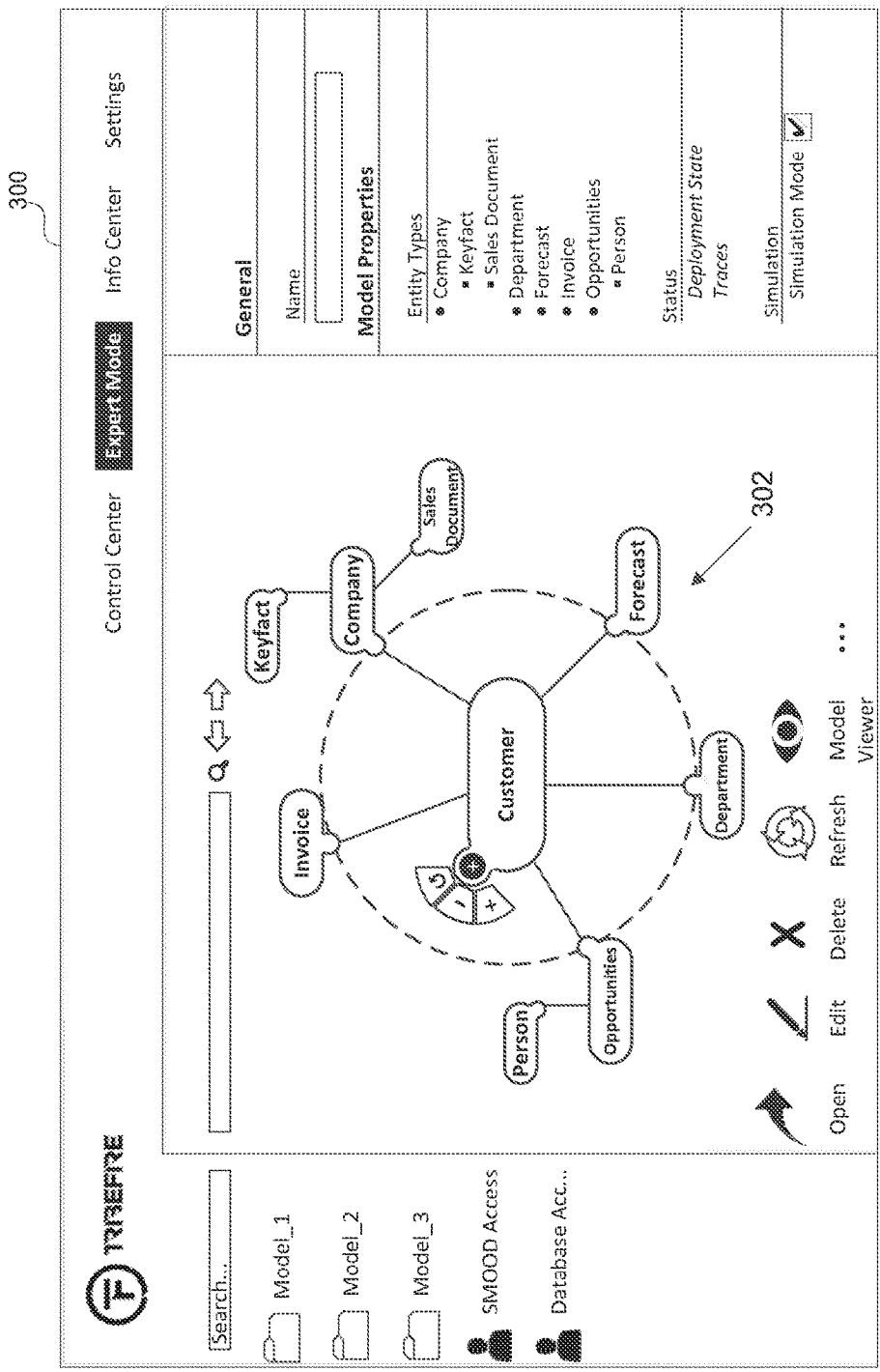
FIG. 3 is an example of a smart model constructed using an integrated graphical modeler.

FIG. 3 is an example of a smart model 302 constructed using an integrated graphical modeler 300. The SEI platform logically differentiates between several model categories, even though technically the models may be similar or identical. Integration models, for example, are often the building blocks used to create smart information (i.e., custom) models, although the integration models could also be used directly.

TABLE I

| | Sample Model Categories |
|---|---|
| System Models | Core models for query, manipulation, metamodel, deployment, etc. |
| | Platform models to handle tenants, projects, users, platform security, etc. |
| Pre-packaged Information Models | Process models, document models, folder models, resource models, etc. |
| Integration Models | Models created automatically during the integration of new data sources (e.g., in combination with according integration access). |
| Smart Information (i.e., Custom) Models | Models built based on business requirements. Models built "from scratch" by creating new code or by combining other models and/or parts of other models. |

Models can be reused and shared within the SEI platform 200, exported to other SEI platforms, and/or imported from another SEI platform. Thus, models are not tied to a physical access point and are generally free to be used anywhere.

To prevent users from modeling common business scenarios over and over again, the SEI platform 200 allows the user to implement previously created models. The preexisting models could, for example, have been created by another user. The SEI platform is also able to differentiate between the reuse of custom models and platform models or entities (e.g., user authentication and authorization) that are predefined and shipped as part of the platform 200. The models, corresponding metadata, or both can be managed by an internal database and stored in a repository (e.g., repository 124 of FIG. 1).

A repository layer 210 represents the existing systems, components, modules, etc., that hold data needed to fill a smart application with useful data. In some embodiments, the repository layer 210 is remote from, but communicatively coupled to, the SEI platform 200. Other layers (e.g., data access and visualization layer 202) could also be remote from (i.e., not a part of) the SEI platform 200.

Figure 4A:
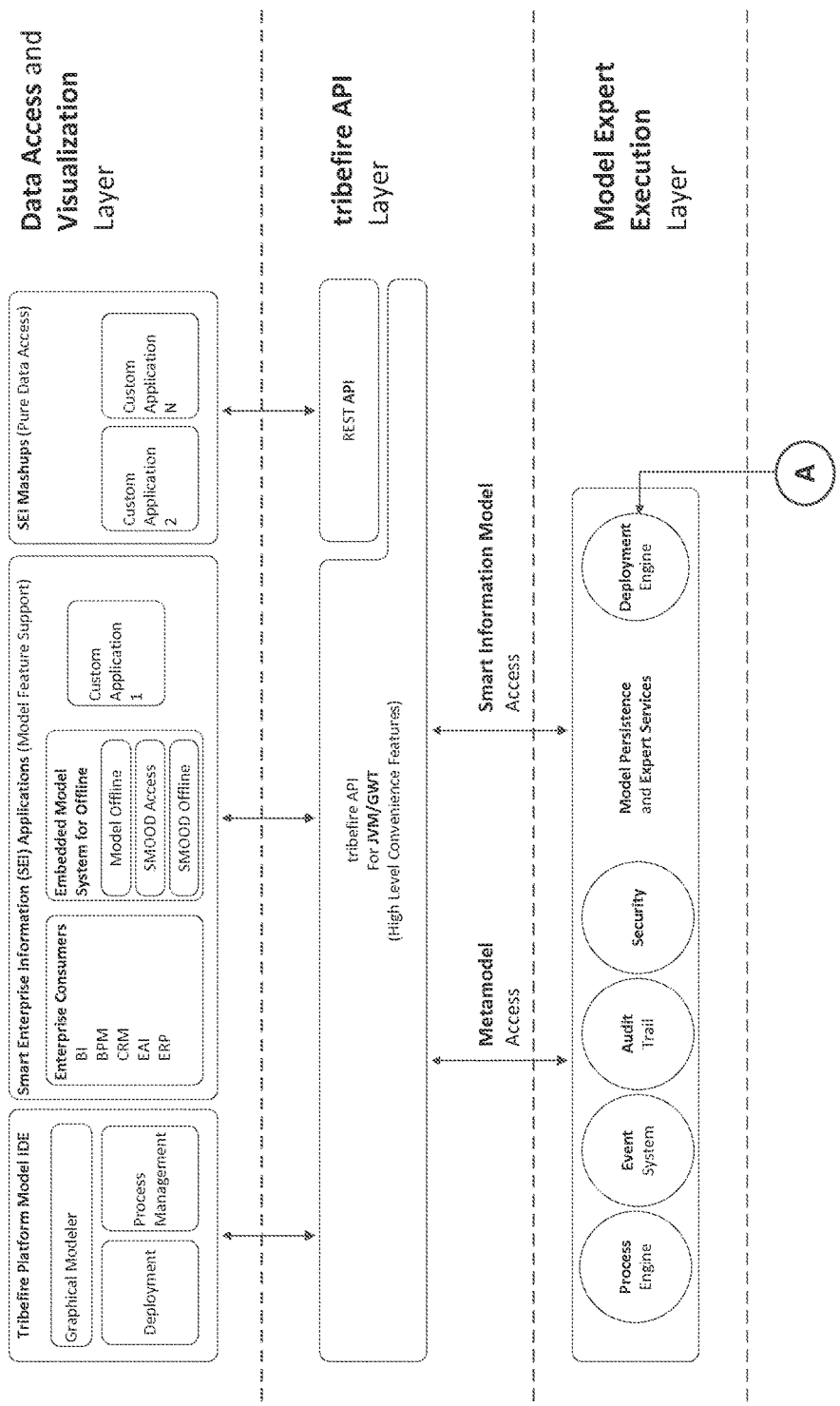
FIGS. 4A-B include a detailed block diagram illustrating the five-layer architecture in accordance with some embodiments.
Figure 4B:
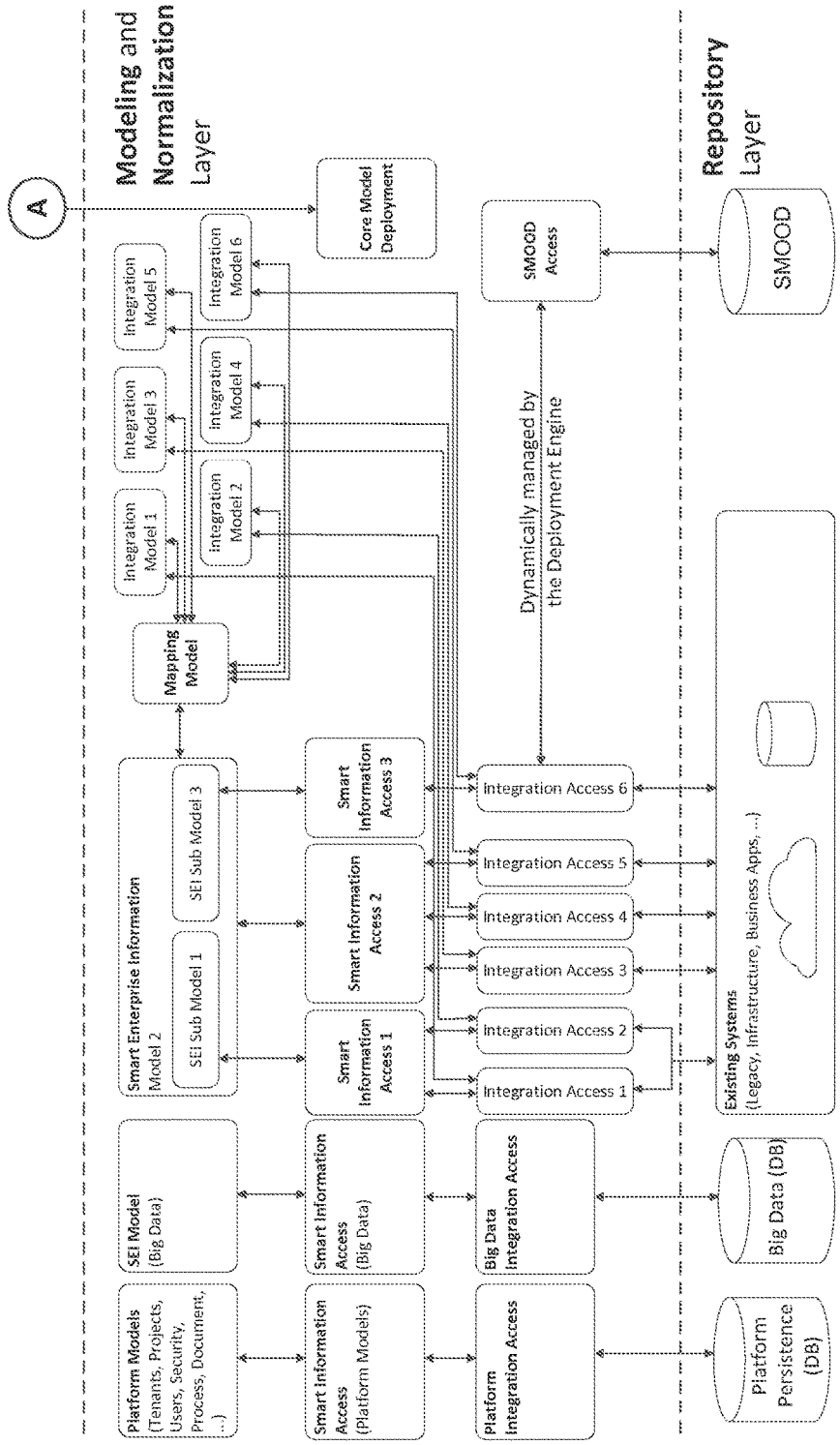

The various layers of the SEI platform 200 unlock the value of enterprise information and facilitate the construction of enterprise applications that serve real business needs and connect to existing data sources. Assorted modules and/or components could be dedicated to performing the responsibilities allocated to each layer. FIGS. 4A-B, for instance, include a detailed block diagram illustrating the five-layer architecture.

tribefire Overview and Features

The core logic of the SEI platforms described herein is referred to as the "CORTEX" or "tribefire CORTEX". The CORTEX is a Gödelized, model-driven system for which the underlying paradigm is not found in other model driven approaches (e.g., MDA, architecture driven modernization (ADM)) to software development. The paradigm is characterized by at least three unique characteristics:

Expert System: The CORTEX separates the formal description of functionality from the functionality itself, which makes it available for decoupled processing, free recombination, etc.

Model Driven: Generally, the formal description of the functionality is given by means of a model definition, which serves as a guarantor for type-safe relationships between the formal terms.

Gödelized: Both the operands and operations of the expert system are represented as models. This normalizes the entire system and allows the description and implementation of reflective operations of all kinds, which opens up a new power of expression and control.

The CORTEX paradigm generally refers to the building up of all aspects of the software (e.g., application creation) process from a modeling point of view. This not only includes data, but also the typical functionality that occurs when working with the data structures (e.g., models). CORTEX can fundamentally change the usage of models in various areas, including definition, reflection, persistence, validation, querying, transportation, manipulation, reproduction, relationship, configuration, security, business content, etc.

Specific optimized experts may implement the functionality of the operational models. Because the models and their described functionalities are typically designed to work with other specific or arbitrary models, it is possible to make these functionalities visible and configurable. Conversely, conventional systems only provide business data and static functionality. Thus, the SEI platforms and CORTEX eliminate the separation of data and code as everything is subordinated into a single paradigm (i.e., everything is a model).

Another distinction when compared to traditional software development approaches is the high reuse of code that by its nature is invariant for unique models. Traditionally, development required large sections of code be rewritten each time a new data structure is created. The SEI platforms described herein employ an integrated expert system that automatically deploys and reuses models without the need to write code. The SEI platforms can also be enhanced with custom code in one or more positions (e.g., validators, transformers/codecs, custom accesses) if an additional functionality is desired that is not supported by one of the preexisting models.

CORTEX's approach to information processing is broadly characterized by the following:

Classification: Achieved using various models that described certain domain(s) of information systems. The models consist of a number of entities that represent and describe the peculiarities of an information object. Those entities have properties that can be realized by simple types (e.g., integer, string, Boolean), complex types (e.g., that reference other entities), or some combination thereof.

Association: Entities can be associated with one another by inheritance and relationships of different cardinality (e.g., single reference, set, list, map).

Dissociation: Can be a matter of security (that is realized using a security model) and/or performance. If a system includes a large network of information objects, loading each entity would significantly harm system performance. In order to avoid this, the CORTEX uses partial representation, which allows the return of absence information (e.g., within the result of a query). Additional data can then be loaded after a particular definable time period (e.g., two seconds) or by directly accessing the entry (e.g., by clicking on it).

Reflection: Allows models to communicate with one another and is typically achieved using a meta-model. Reflection also provides certain capabilities, including the ability to create and/or modify models and entity types at runtime, create and/or modify entity instances and metadata at runtime, let models read out values stored in other models, let models know the state of other models, etc.

Reproduction: Covered by an SEI platform's access to the persistence layer by its different integration accesses, as well as by the manipulation model. The manipulation model can create new entity instances that track changes for any manipulation undertaken on a model's properties, as well as on the actual information (i.e., entity instances).

Approach for Constructing Enterprise Applications

Figure 5:
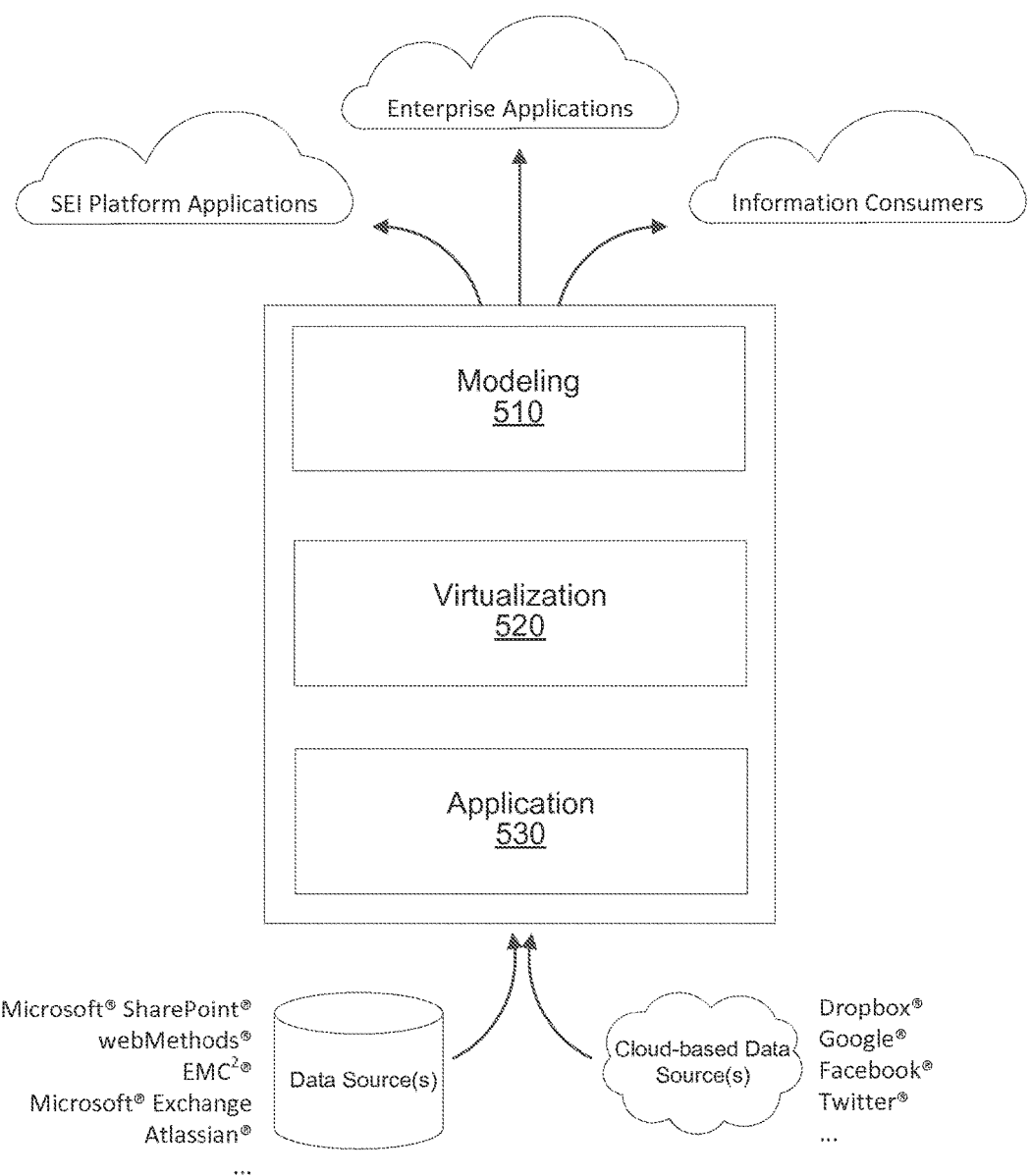
FIG. 5 depicts a three-step approach for constructing a smart model that utilizes the benefits provided by an SEI platform as may occur in various embodiments.

FIG. 5 illustrates a three-step approach for constructing a smart model that utilizes the benefits provided by an SEI platform hosted by a server (e.g., host server 100 of FIG. 1). The three-step approach represents a unique approach to building smart enterprise applications.

The modeling aspect 510 provides models that represent the necessary business information based on the data present within the underlying applications. The virtualization aspect 520 is responsible for establishing connections with one or more repositories.

Creating these models allows the users of an SEI platform (e.g., tribefire customers) to generate or identify new and valuable information based on the data retrieved from different internal and external repositories. The application aspect 530 provides the interface for developers and offers a wide variety of ways to access the model.

I. Modeling

Figure 6:
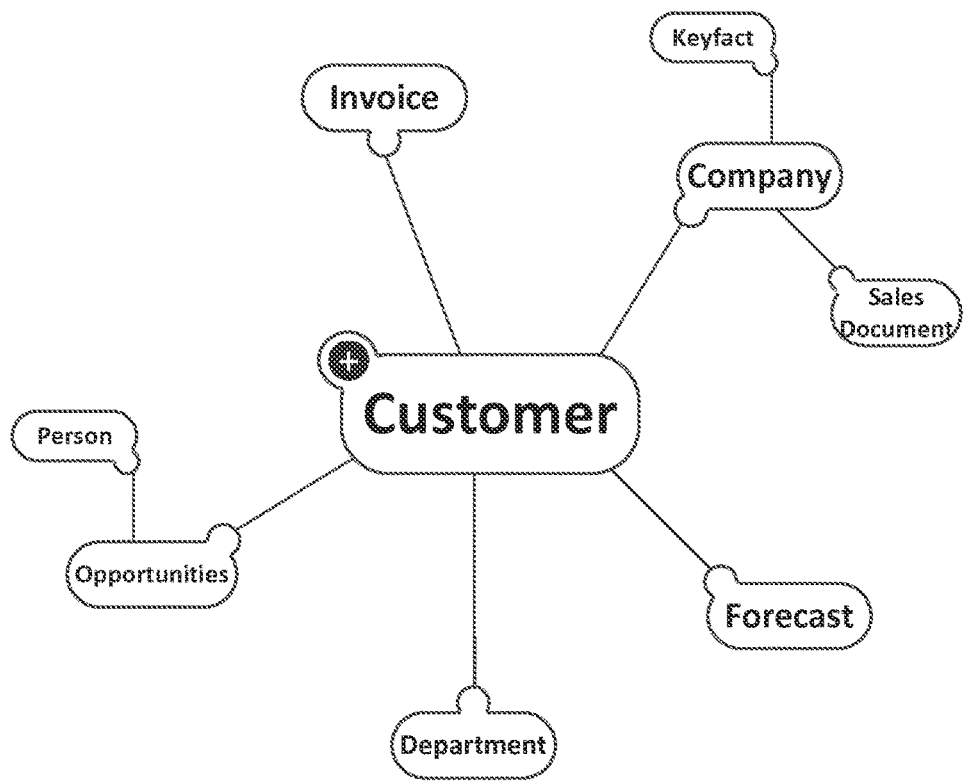
FIG. 6 is a sample model as may be designed and provided to a modeler.

Oftentimes, the process begins with the design of screen mockups of the desired enterprise application by a user (e.g., end-user of application, management executive). FIG. 6 depicts an example of such a model. The screen mockups can be given to a modeler (e.g., business expert) who models the required information objects without coding.

An integrated graphics modeler (e.g., modeler 300 of FIG. 3) can be used to create basic business entities, such as customer, company, opportunity, etc., and represent the relationships between those entities. Models can also be further enriched with attributes that describe the entities in greater detail. For example, the SEI platform can be configured to support a broad variety of property types (e.g., string, integer, date, enumerations, collections) that a user can choose from. Both the information objects and the required operators (i.e., functions) are modeled.

II. Virtualization

After completing development, the application is typically tested and validated (e.g., based on its business requirements). Integration experts can start integrating the application by configuring and mapping integration accesses to the model. The integration accesses allow the application to connect with whatever real systems are needed to provide the necessary data. After connecting to the real systems, no changes to the application are required; the application continues to communicate with the model.

The virtualization layer 520 can generate interfaces and provide standard accesses that allow enterprises of any size to integrate their repositories and connect to other storage solutions (e.g. file systems, databases, business applications, infrastructure components, big data, cloud-based systems). In some embodiments, ready-to-use connectors are able to provide fast access to these repositories and are easily modifiable to integrate custom solutions.

The virtualization layer 520 also simplifies migration to new repositories and avoids issues that traditionally make migration a time-consuming process. By mapping metadata, data can be seamlessly exchanged between customers, suppliers, and partners. More specifically, the virtualization layer 520 can serve as a neutral layer between existing systems (e.g., host and/or client server), programs, and data sources and provide generic services for persistence, retrieval, and management of the data. Virtualization simplifies the integration of new data by offering complete platform-independence and support for all major relational databases.

Consequently, users are able to perform transparent, distributed searches in different information repositories. Search results may be generated from the data according to a specific schema and information related to the search query could be transferred back to the requesting application.

III. Application

After the model is deployed in an SEI platform, developers (e.g., front-end developers, experience designers) can start developing the enterprise application by connecting it to one or more APIs. This approach permits rapid prototyping with short iteration cycles for validation of the enterprise application against stakeholder expectations.

The developers need not worry about where the necessary data physically resides because it can be simulated within the SEI platform. As the model can be completely decoupled from underlying data sources, development data can be stored within an internal smart memory object-oriented database (SMOOD). This is referred to as "Simulation Mode." The SMOOD combines the advantages of different database technologies, resulting in a database that is capable of handling object-oriented structures while also providing a powerful query language.

Various frameworks and corporate standards can be applied during development of the application. The developers may be able to freely choose their preferred technology as long as they connect using the Java API or the REST API.

Among other benefits, the three-step approach permits unbundling and parallelization of work between various involved stakeholders. This accelerates the application development process, resulting in quicker development and lower development costs in comparison to traditional approaches to software development.

Modeled Algebra

I. Operators

Various operators have been identified, researched and implemented into the CORTEX technology. These operators are represented by normalized models and can be enriched by expert code.

TABLE II

Examples of Modeled Operators

| Operator | Description |
| --- | --- |
| Reflect | Operator permits the description, analysis, and synthesis of various types and properties of a model. Also allows access to the model's instance level. |
| Manipulate | Operator is able to apply atomic manipulations to the elements (e.g., nodes, instances) of a pool or instance. |
| Conditional Traverse Clone Serialize Visit | Operator traverses a network of instances of an arbitrary model and aborts the process by matching predefined patterns acting on the traversing path. Can be attached to the basic operator and/or payload functions, such as clone, serialize, visit, etc. |
| Incremental Persist | Operator builds and maintains a persistent pool of instances and uses the manipulate operator and corresponding operands as an exchange format. |
| Select | Operator isolates and selects a particular subset of instances from a pool based on provided conditions. |
| Assemble | A complex instantiating operator that permits the creation of complete instance nets (i.e., assemblies) using the clone operator and a prototype and individual shaping of the clones with the manipulation operator. Serves as the base for template systems. |
| Annotate | Operator supplements the reflect operator and allows management of arbitrary additional information of a model in the form of metadata. Examples include rules for access, validation, internationalizing, visual processing in user interfaces, etc. Operator also enables the use of generic viewers and editors. |
| Validate | Operator is a partial aspect of the incremental persist operator and can be used to validate manipulations of a model with respect to the validation rules. |
| Trigger Audit Process | Operator is a partial aspect of the incremental persist operator and can conditionally trigger events by means of the reflect operator. Such an event could be, for example, an auditing run on certain changes or procedural continuation of an attached functionality. |

II. Reflectivity

By modeling and implementing an executing expert system, the model algebra is applied to itself. Within the algebra, the operators may also be potential operands that are represented as a model. This reflectivity illustrates the improved availability and flexibility of tools if they are malleable objects. Reflectivity results from Gödelization of the algebra and, more specifically, normalization of the operators and operands. Reflexive operators can be founded as a consequence of Gödelization and chaining of the operators.

CORTEX Paradigm

I. Basic Demarcation

The CORTEX paradigm shares a number of features with Model Driven Architecture (MDA). For example, CORTEX uses concepts such as Architecture Driven Modernization (ADM), mechanisms and patterns of description like Object Constraint Language (OCL), and standards like Meta Object Facility (MOF). CORTEX is conceptually based on Object-Oriented Programming (OOP), but also uses principles of Aspect-Oriented Programming (AOP) and integrates concepts of expert systems.

Similar to MDA, CORTEX attempts to reach a certain degree of automation through formalization without enforcing total automation. In various embodiments, CORTEX introduces demarcation of technical (e.g., generic) and functional (e.g., expressive) aspects, facilitates an interactive and iterative practice, and supports platform-independent descriptive language.

However, CORTEX clearly differs from a conventional MDA approach not only in its implementation, but also in its conceptual design. For example, CORTEX differentiates itself from standard OOP because the functionalities described herein are not present in the types themselves, but are introduced by late binding. CORTEX, unlike AOP, also includes point-cuts that are exclusively attached to the access points of the different properties of the modeled types in a normalized way. Further yet, CORTEX differs from traditional expert systems in that expert logic is defined as model representing types.

II. Code Generation

Unlike MDA, separation of the different aspects is not achieved through the use of code generators. Instead, the CORTEX paradigm introduces (1) invariant (i.e., technical) and (2) variant (i.e., case-specific) code. In some embodiments, the platform refrains from automatically producing the variant part of the code in order to avoid fundamental problems in MDA (e.g., necessary over-specifying of software aspects, raising demand on the model and modeler skills, inefficiency compared to template-based code).

The variant portion of the code can be adapted to the use case (i.e., model or functionality) and can be supported by a set of functions that are exposed in the CORTEX API. Consequently, specific demands can be extensively reduced, which matches the actual requirements of the software industry.

Similarly, invariant code that is not generated by code generators may remain highly efficient code whose genericity allows for reuse. The invariant code generally shows no compromise between categorization (e.g., as a consequence of code generators or their templates) and performance. Moreover, the invariant code is accessible in most cases by means of the normalizing modeled algebra.

Unlike many systems that support generic invariant code, the variant specialist code remains on a commonly used level that is understood as a programming language. Therefore, features like compiler-supported type-conformant use of a model remain possible, despite being a generic programming paradigm. Meanwhile, type-bound coding doesn't limit the potential of genericity. In fact, the full set of established invariant functionality can be used transparently or explicitly. Specialist code remains condensed and more readable. Thus, CORTEX reduces the technical skill requirements in designing and constructing enterprise application.

III. Standardization

CORTEX represents marked differences in dealing with meta models and the use of MOF. If modeling and validation are kept separated (e.g., using a multi-tier model in MOF as opposed to OCL, Schematron, etc.), both aspects can be unified directly into modeling using CORTEX. Typically, this is done through the addition of a selector principle, which allows a validation to react on system states. Therefore, conditions may or may not apply to a certain user group of an application depending on system time or some other variable.

IV. Gödelization

CORTEX can further put the description of the meta level of models and their concrete instantiation levels into the same domain, both conceptually and technically. This can be compared to the relationship of XSD and XML, where XSD itself is an expression of XML and a ruleset for an XML format. Thus, the meta level becomes accessible to the tools it establishes, which is a form of Gödelization. Using a normalizing artifice, CORTEX is able to normalize the types of a model and their instances by describing the types unambiguously and reflectively through instances of the meta model. Thus, CORTEX associates the model types and submits them in the same form of representation. As in Gödel's method, a higher level of power (i.e., increased functionality) arises when dealing with the models.

V. Inclusion of an Industrial Application

MDA doesn't inherently deal with the finiteness of resources (e.g., time and memory). CORTEX considers these limitations conceptually using the modeled conditional traversing operator that allows for partial representations. In some embodiments, partial representations are necessary as the extraction of a single object from the persistence stratum may lead to the delivery of a block of data that overwhelms any form of representation (e.g., due to its relations to other objects). Unlike conventional systems, no new form of representation is chosen for the delivery of model data and no use-case and/or type specific representation is generated.

CORTEX further distinguishes between modeling abbreviated substitute information and the conditional disruption of traversing processing (e.g., during serialization and cloning). This form of partial representation is compatible with the expressive representation of classes with a language system (e.g., Java). This approach substantially avoids multiple instances of modeling content that needs to be transferred. CORTEX instead uses AOP techniques to transparently load data that is left behind so that a programmer does not need to worry about the data.

VI. Conclusions

One of the fundamental conceptual differences between CORTEX and MDA-based approaches is that CORTEX not only condenses the work of the developer (e.g., programmer), but can be used by the business user (e.g., end-user). CORTEX differentiates itself from alternative approaches to software development and describes a holistic approach to interacting with data. The CORTEX paradigm can be used for more than software development due to normalization, reflexive algebra, etc.

Verifiable Results

The manipulation model, which is an operator model that describes the creation of instances and the manipulation of specific properties of concrete instances, is one example of increased functionality due to the CORTEX paradigm. For any type of manipulation model, an associated expert can translate the manipulation into the real execution. Manipulations that are expressed by the manipulation model are normally repeatable, invertible, persistable, transportable, etc., at any time.

In order to bypass cumbersome manual creation of instances of various manipulation model types, the CORTEX may implement aspects of AOP to trace changes of instances of any model. The recording process, which may be referred to as "manipulation tracking," allows the manipulation model to be used as one of the fundamental CORTEX models. Advantages include the ability to be conveniently implemented without relying on the discipline or skill of the programmer.

The intrinsic use of the manipulation can automatically unlock certain fundamental features for other models, the corresponding reflection, and operators without any additional effort.

TABLE III

Examples of Fundamental Features

| Application Domain | Description |
| --- | --- |
| Undo/redo in editor(s) | General navigation during the editing process |

TABLE III-continued

Examples of Fundamental Features

| Application Domain | Description |
| --- | --- |
| Incremental update of persistence layer | Any form of programmatic or manual changes of instances may be automatically persistable without additional programming effort or synchronization. |
| Rollbacks across technology boundaries | XA-transaction across different database systems at any point in time; can also be content-driven inversion of stored manipulations. |
| IT security aspects | As the incremental updates of the persistence layer are normalized, the updates can be checked for coherence accord to validation and security conditions. |
| Staging | Management of derivations of standard configurations by applying stored manipulations to distribute specific expressions |
| Model view controller pattern | Instances of manipulations that have been recorded by manipulation tracking can be received by other system parts using an event listener pattern and used for model view synchronization and audit trail. |
| Concurrent editing | Applying model view controller (MVC) pattern across computers |
| Templates | Manipulations that have been explicitly recorded can be used as dynamizable script and applied to a prototype, which together with the script form the template. Keywords include "saved searches" and "scripting by example." |
| Offline clients | Synchronizing local changes with the central data persistence layer, request-triggered or through detection of availability |

Figure 7:
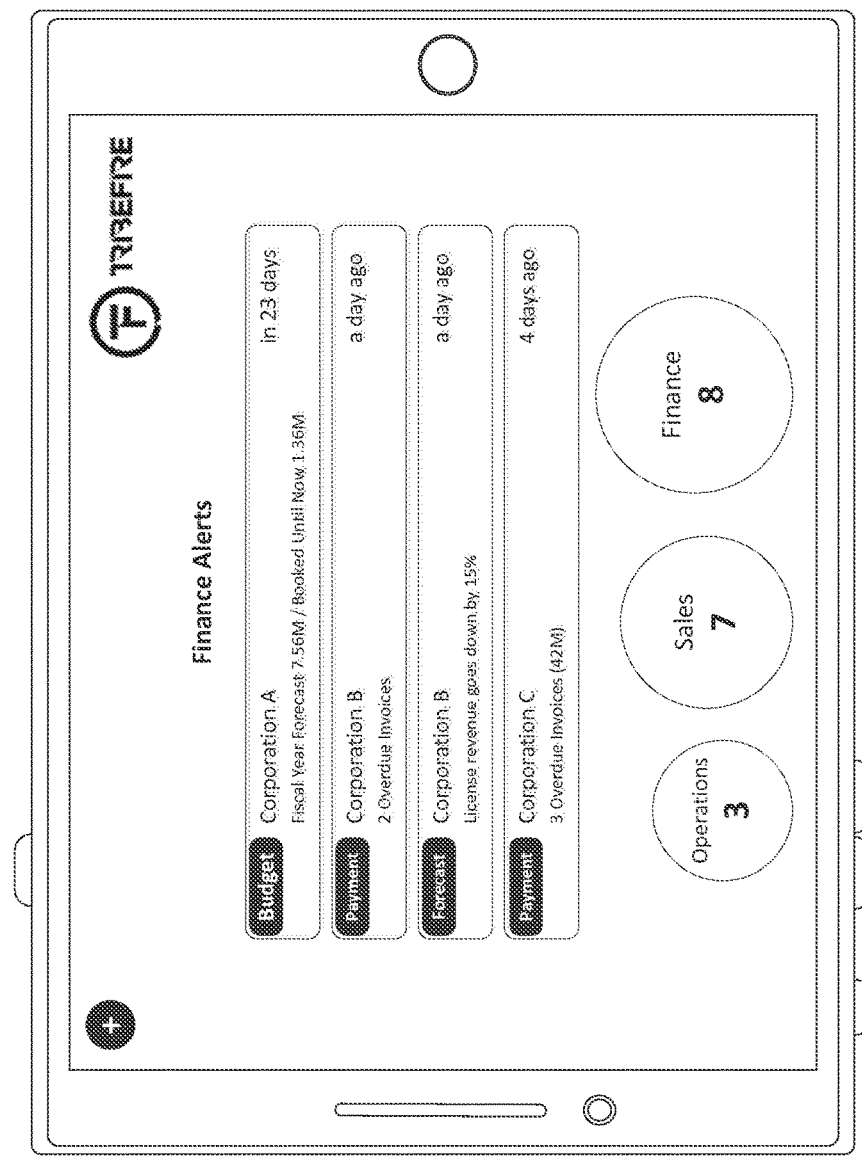
FIG. 7 is an example of an interface that provides a complete view of customer information.

The enterprise application can subsequently be viewed, used, etc., using a GUI. FIG. 7 is an example of an interface that provides a complete view of customer information. The corresponding application can be configured to connect to various back-end systems, such as ERP, CRM, ECM, SharePoint®, Dropbox®, Twitter®, Bloomberg®, etc., to gather the necessary data for a particular set of information. The user interface itself can be developed in various markup languages. For example, the application can be developed using HTML5, which permits information to be read from and written to the aforementioned connected systems from a user device (e.g., mobile phone, tablet).

Templates can be implemented by tracking the manipulations of the each model (e.g., using AOP tracking, experts). Each template is composed of at least two components: (1) a prototype assembly that represents a static network of business entities; and (2) a manipulation script that includes incomplete instructions for manipulating the model entities. The entities of the manipulation model contain not only static assignment values, but also other variables dynamizing elements. Therefore, the manipulation script is susceptible to contextual information, individual expressions of the respective result of the manipulation script on the prototype assembly, etc.

Templates could also be created for models that do not support dynamization (e.g., because the prototype and manipulation script are clearly demarcated). Manipulations manually imposed on the models are normally applied by a manipulation script. The content of the template may not be restricted to business data and could include, for example, technical aspects, such as experts and models.

In some embodiments, templates are dynamized with the aid of manipulation tracking. More specifically, instances of the manipulation model may be created whenever normal changes are made through an automatic or manual process. The number of instances created by this process is post-processed, replacing the recorded static values of the individual changes with corresponding variables having an initial (i.e., default) value that represents the former static value. The changes may be reversible, which allows the model to be returned to its initial state.

General Benefits

The Gödelized models and SEI platforms described herein are able to provide a holistic view of the software development process. The SEI platforms can be operated in the cloud (i.e., using DaaS/DaaP architecture) or locally using a version of the corresponding technology. Data can be retrieved from various sources and used to support modeling decisions (e.g., a rule engine may dictate or propose functionality). Other benefits over conventional methods include:

Building Bridges: Models are easily used to describe requirements of nearly any kind (e.g., business, technical) that are understood by stakeholders (e.g., users, developers, experts) during the development process.

Extensibility: The capabilities of the SEI platform can be enhanced by calling custom code through an event system. The models provide a large set of possible interaction points for custom code, such as accesses, experts, and validators. Automated model manipulations may also be achieved using an integrated process engine.

Quick Learning: The models are largely self-descriptive due to their expressiveness and, therefore, are easy to understand and use via APIs.

Quicker Development Cycle: By reusing accesses and/or models, the resources (e.g., coding, time, cost) necessary for development and testing can be reduced.

Reduced Testing/Validation: An expert system can be tested by a single master model that includes all capabilities, thereby reducing or eliminating the need to test other newly-created models.

Easier Structure Creation: Model descriptions can be used to create data structures in a repository, as well as integrate data or structures from existing repositories. For example, a model can be translated (e.g., with the corresponding access) into SQL statements that automatically create the table structure, columns, primary key, foreign key, etc.

Figure 8A:
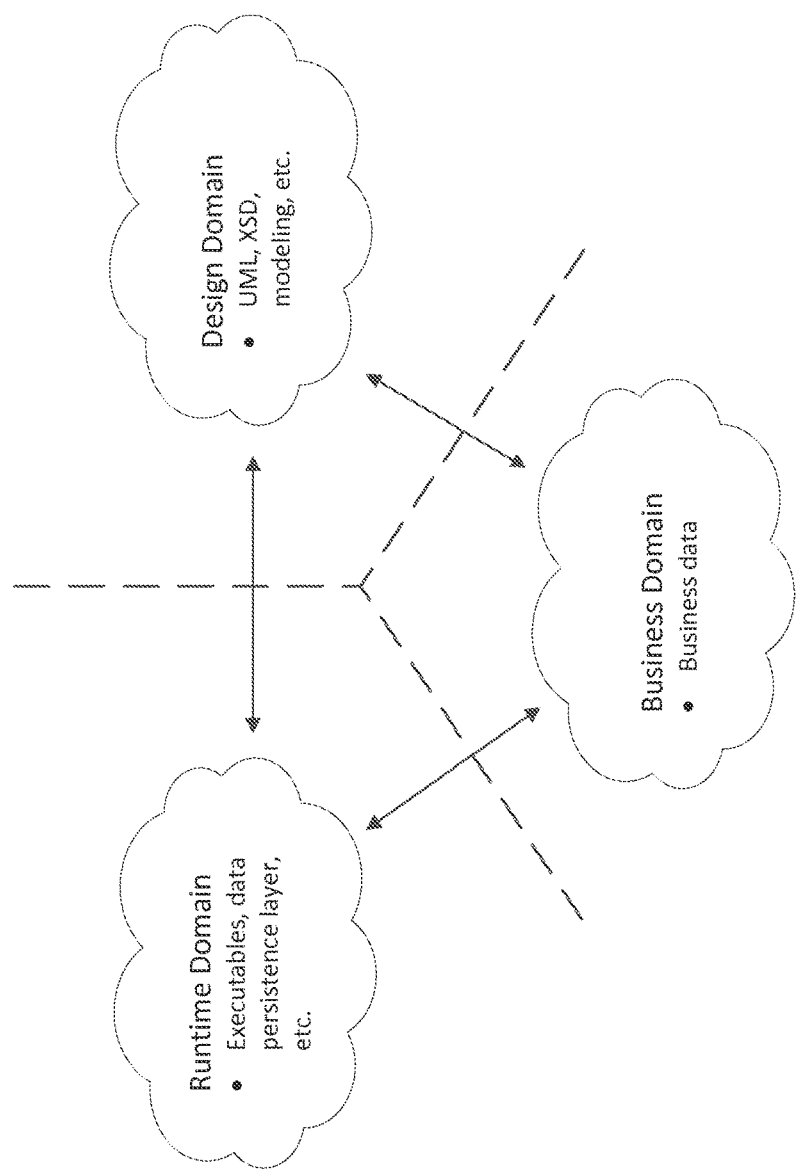
FIGS. 8A and 8B depict a classic (i.e., conventional) software development system and a Gödelized generic model system, respectively.
Figure 8B:
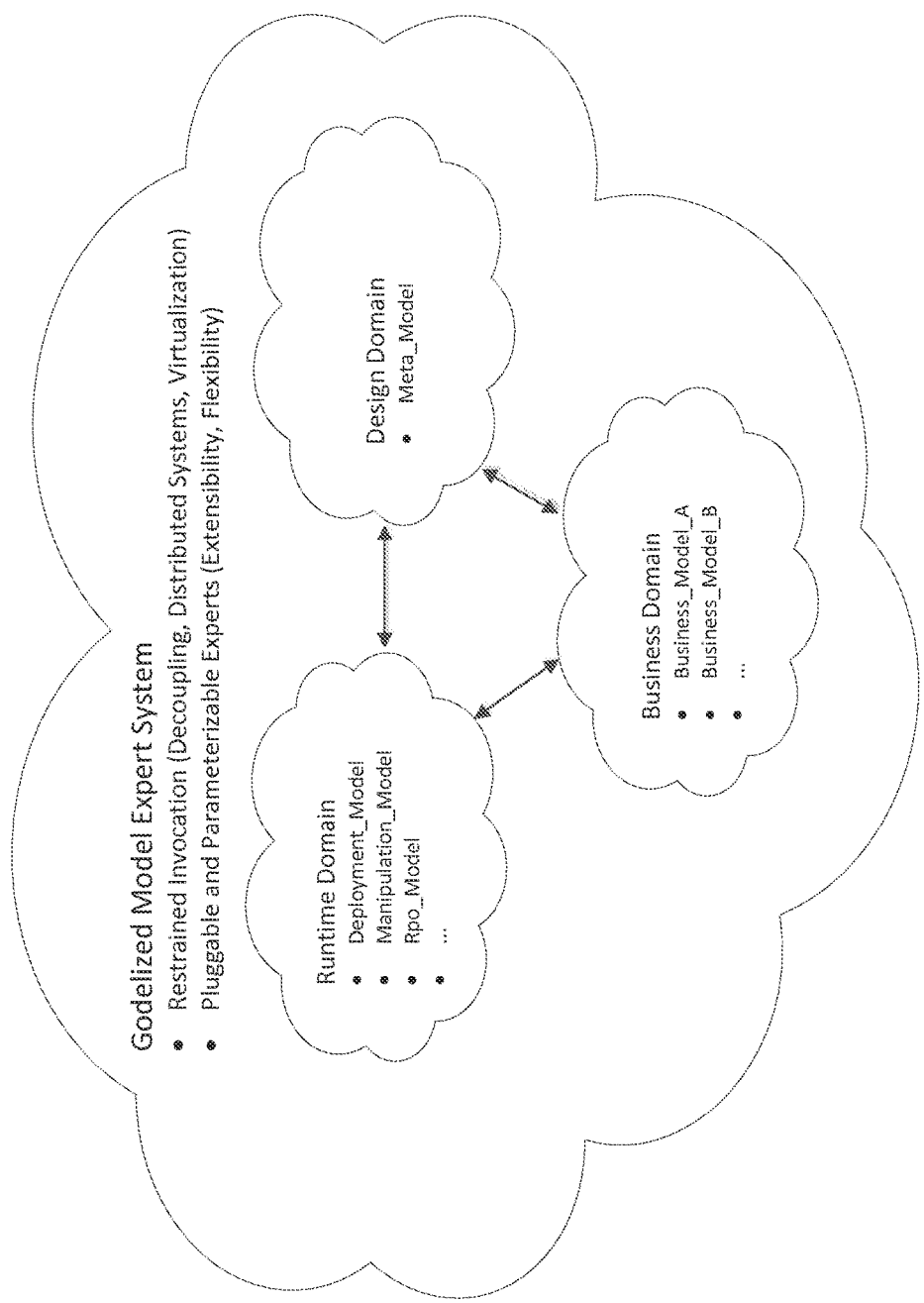

FIGS. 8A and 8B, for instance, illustrate a classic ("conventional") software development system and a Gödelized generic model system, respectively. "Gödelizing" the models allows the SEI platform to promote a unified way of describing and processing issues and capitalize on cross-domain synergies. Unlike a conventional system, the "Gödelized" system supports a unified manner of describing, processing, etc., the models, which is reflected in the system components.

Creation Process

Figure 9:
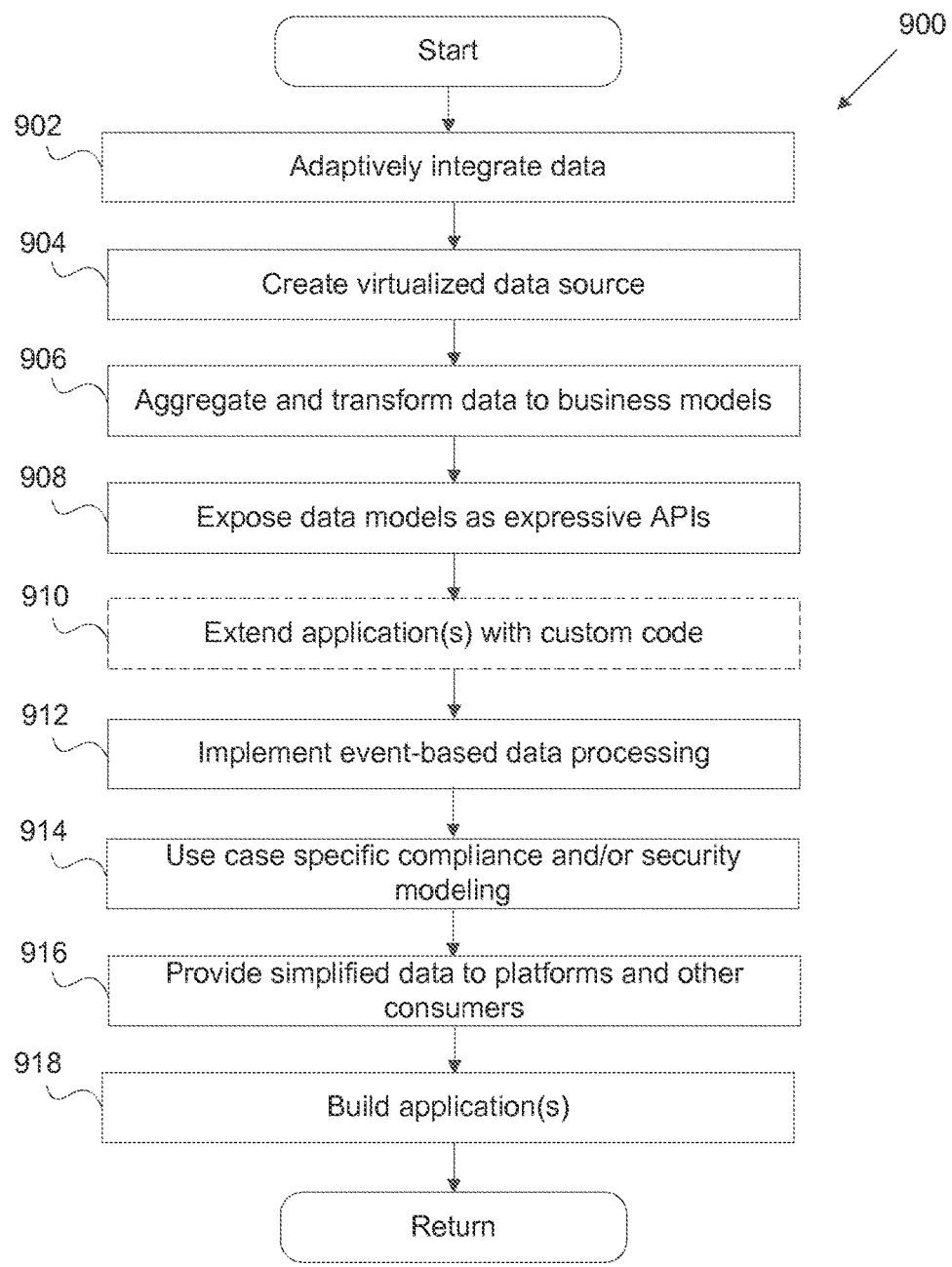
FIG. 9 is a flow diagram depicting general steps in process for creating models that are subsequently used to construct an application.

FIG. 9 is a flow diagram depicting general steps in process 900 for creating models that are subsequently used to construct an application.

At block 902, an SEI platform can adaptively integrate data from one or more sources. For example, a server on which the SEI platform is hosted can establish connections with big data sources, cloud-based storages, media servers, etc. At block 904, the SEI platform provides a virtualized data source based on existing data sources to simulate data content with a subsequent full integration. At block 906, the SEI platform (e.g., via one or more specialized modules) aggregates and transforms the data into one or more business models. Each business model can, for example, represent a unique arrangement and/or selection of business entities.

At block 908, the models are exposed or represented by one or more expressive APIs. The APIs are automatically created out of the model definitions and support particular functionalities.

In some embodiments, the application is extended with customized code to provide one or more additional functionalities that are unsupported by the preexisting models, as shown at block 910. At block 912, the SEI platform can implement event-based data processing to help construct the application (e.g., using a state engine). At block 914, the SEI platform may create the application according to some type of case-specific compliance and/or security modiling technique.

At block 916, the data, or a simplified version of the data, is provided to the SEI platform to validate and test the application. At block 918, a user (e.g., a customer) of the SEI platform can begin to construct an enterprise application by combining one or more models. Construction of the application is a substantially streamlined process that does not depend on the skill of the developer.

In some embodiments, one or more of the steps could be done in parallel. For example, steps 908, 910, and 912 can be performed simultaneously. Similarly, steps 914 and 916 may be performed concurrently.

Computer System

Figure 10:
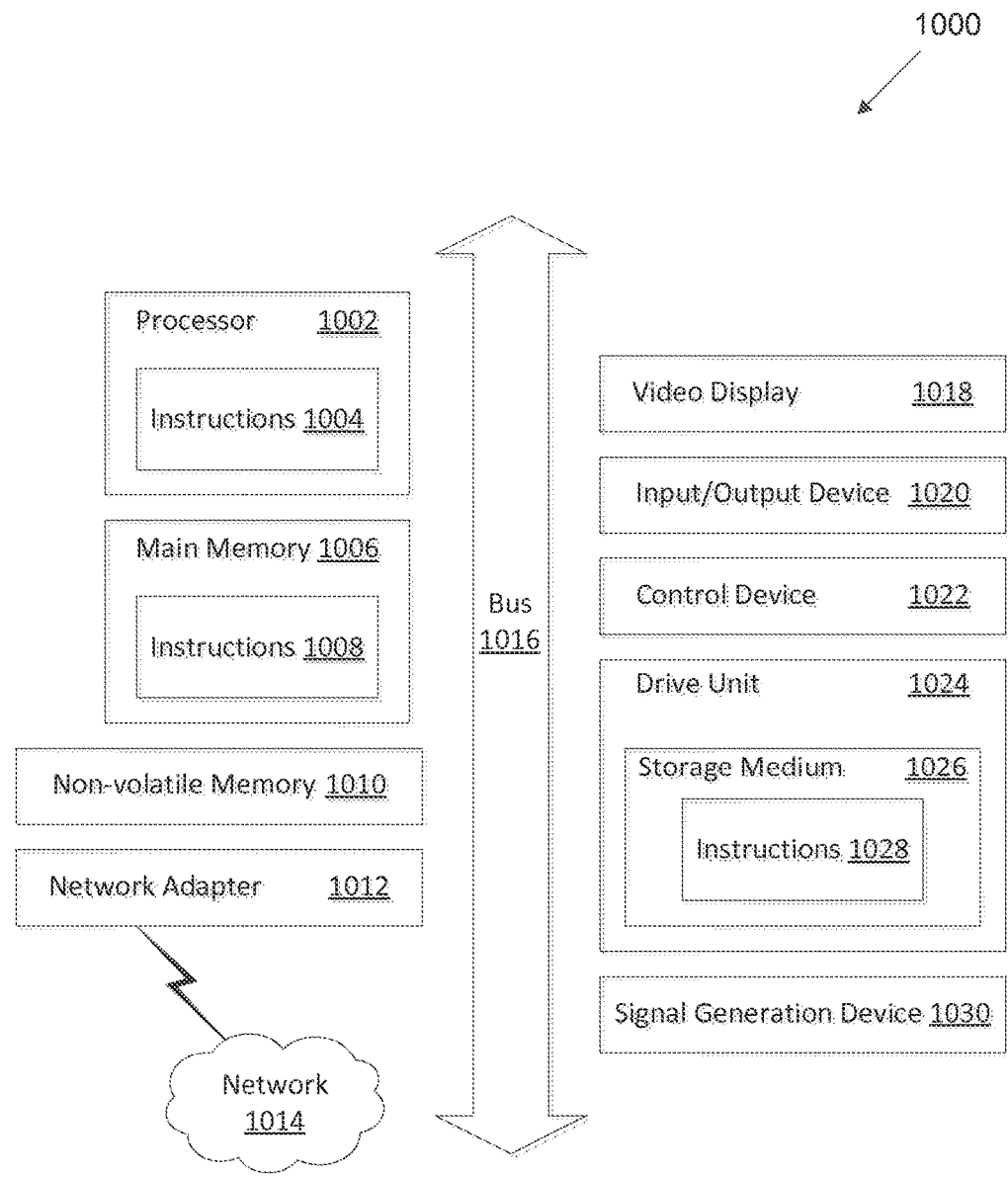
FIG. 10 is a block diagram illustrating an example of a computing system in which at least some operations described herein can be implemented.

FIG. 10 is a block diagram illustrating an example of a computing system 1000 in which at least some operations described herein can be implemented. The computing system may include one or more central processing units ("processors") 1002, main memory 1006, non-volatile memory 1010, network adapter 1012 (e.g., network interfaces), video display 1018, input/output devices 1020, control device 1022 (e.g., keyboard and pointing devices), drive unit 1024 including a storage medium 1026, and signal generation device 1030 that are communicatively connected to a bus 1016. The bus 1016 is illustrated as an abstraction that represents any one or more separate physical buses, point to point connections, or both connected by appropriate bridges, adapters, or controllers. The bus 1016, therefore, can include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the computing system 1000 operates as a standalone device, although the computing system 1000 may be connected (e.g., wired or wirelessly) to other machines. In a networked deployment, the computing system 1000 may operate in the capacity of a server or a client machine in a client-server network environment, or as a peer machine in a peer-to-peer (or distributed) network environment.

The computing system 1000 may be a server computer, a client computer, a personal computer, a user device, a tablet, a laptop computer, a PDA, a cellular telephone, an iPhone, an iPad, a Blackberry, a processor, a telephone, a web appliance, a network router, switch or bridge, a console, a hand-held console, any portable/mobile hand-held device, or any machine capable of executing a set of instructions (sequential or otherwise) that specify actions to be taken by the computing system 1000.

While the main memory 1006, non-volatile memory 1010, and storage medium 1026 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 1028. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 1004, 1008, 1028) set at various times in various memory and storage devices in a computer, and that, when read and executed by one or more processing units or processors 1002, cause the computing system 1000 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices 1010, floppy and other removable disks, hard disk drives, optical disks (e.g., Compact Disk Read-Only Memory (CD ROMS), Digital Versatile Disks, (DVDs)), and transmission type media such as digital and analog communication links.

The network adapter 1012 enables the computing system 1000 to mediate data in a network 1014 with an entity that is external to the computing device 1000, through any known and/or convenient communications protocol supported by the computing system 1000 and the external entity. The network adapter 1012 can include one or more of a network adaptor card, a wireless network interface card, a router, an access point, a wireless router, a switch, a multi-layer switch, a protocol converter, a gateway, a bridge, bridge router, a hub, a digital media receiver, and/or a repeater.

The network adapter 1012 can include a firewall that can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can include, but are not limited to, intrusion-prevention, intrusion detection, next-generation firewall, personal firewall, etc.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A system for developing software applications from preexisting, comprehensive, and new models, the system comprising:
   a hardware processor communicatively coupled to a modeling module, an application development module, and a virtualization module;
   the modeling module configured to:
      generate an integrated graphical modeler that is viewable on a display of a user device;
      receive input from the user device indicative of user input that specifies which of a plurality of business entities are to be used in constructing a model,
         wherein the user input is provided via the integrated graphical modeler that includes visual elements corresponding to the plurality of business entities; and
      construct the model that represents a business scenario involving the specified business entities by connecting the corresponding visual elements;
   the application development module configured to:
      express the model as one or more application programming interfaces (APIs); and
      deploy the model in a simulation mode so that development data necessary for development and prototyping of a software application is stored in an internal smart memory object-oriented database,
         wherein the development data simulates real data required by the software application upon deployment;
   the virtualization module configured to:
      retrieve and integrate real data specified as necessary by the model,
         wherein the real data is retrieved from one or more real storage systems;
      configure integration access parameters; and
      map the real data and the integration access parameters to the model; and
   a repository configured to store the model, the one or more APIs, the internal smart memory object-oriented database, the real data, or some combination thereof.

2. The system of claim 1, wherein each of the plurality of business entities represents a customer, a company, an opportunity, a document, an invoice, an individual, or a department.

3. The system of claim 1, wherein the model can be further enriched with attributes that describe the specified business entities in greater detail.

4. The system of claim 3, wherein the attributes are manually entered by the user via the integrated graphical modeler.

5. A computer-implemented method for developing software applications from preexisting, comprehensive, and new models, the computer-implemented method comprising:
   generating, by a modeling module, an integrated graphical modeler that is viewable on a display of a user device;
   receiving, by the modeling module, input from the user device indicative of user input that specifies which of a plurality of business entities are to be used in constructing a model,
      wherein the user input is provided via the integrated graphical modeler that includes visual elements corresponding to the plurality of business entities;

constructing, by the modeling module, the model that represents a business scenario involving the specified business entities by connecting the corresponding visual elements;

expressing, by an application development module, the model as one or more application programming interfaces (APIs);

deploying, by the application development module, the model in a simulation mode so that development data necessary for development of a software application is stored in an internal smart memory object-oriented database,
  wherein the development data simulates real data required by the software application upon deployment;

retrieving and integrating, by a virtualization module, real data specified as necessary by the model,
  wherein the real data is retrieved from one or more real storage systems;

configuring, by the virtualization module, integration access parameters;

mapping, by the virtualization module, the real data and the integration access parameters to the model; and storing the model, the one or more APIs, the internal smart memory object-oriented database, the real data, or any combination thereof in a repository.

6. The computer-implemented method of claim 5, wherein each of the plurality of business entities represents a customer, a company, an opportunity, a document, an invoice, an individual, or a department.

7. The computer-implemented method of claim 5, wherein the model can be further enriched with attributes that describe the specified business entities in greater detail.

8. The computer-implemented method of claim 7, wherein the attributes are manually entered by the user via the integrated graphical modeler.

9. A non-transitory computer-readable medium with instructions stored thereon that, when executed by a hardware processor, cause the hardware processor to perform operations comprising:

generating an integrated graphical modeler that is viewable on a display of a user device;

receiving input from the user device indicative of user input that specifies which of a plurality of business entities are to be used in constructing a model,
  wherein the user input is provided via the integrated graphical modeler that includes visual elements corresponding to the plurality of business entities;

constructing the model that represents a business scenario involving the specified business entities by connecting the corresponding visual elements;

expressing the model as one or more application programming interfaces (APIs);

deploying the model in a simulation mode so that development data necessary for development of a software application is stored in an internal smart memory object-oriented database,
  wherein the development data simulates real data required by the software application upon deployment;

retrieving and integrating real data specified as necessary by the model,
  wherein the real data is retrieved from one or more real storage systems;

configuring integration access parameters;

mapping the real data and the integration access parameters to the model; and storing the model, the one or more APIs, the internal smart memory object-oriented database, the real data, or any combination thereof in a repository.

10. The non-transitory computer-readable medium of claim 9, wherein each of the plurality of business entities represents a customer, a company, an opportunity, a document, an invoice, an individual, or a department.

11. The non-transitory computer-readable medium of claim 9, wherein the model can be further enriched with attributes that describe the specified business entities in greater detail.

12. The non-transitory computer-readable medium of claim 11, wherein the attributes are manually entered by the user via the integrated graphical modeler.

* * * * *